(12) United States Patent
Thompson et al.

(10) Patent No.: US 11,571,106 B2
(45) Date of Patent: Feb. 7, 2023

(54) BBQ GRILL SCRAPER

(71) Applicant: Thompson Brothers & Company LLC, Oakdale, MN (US)

(72) Inventors: Nathan A. Thompson, North St. Paul, MN (US); Joshua J. Thompson, St. Paul, MN (US); Jason S. Thompson, Oakdale, MN (US)

(73) Assignee: Thompson Brothers & Company LLC, Oakdale, MN (US)

( * ) Notice: Subject to any disclaimer, the term of this patent is extended or adjusted under 35 U.S.C. 154(b) by 0 days.

(21) Appl. No.: 16/847,104

(22) Filed: Apr. 13, 2020

(65) Prior Publication Data

US 2020/0237155 A1   Jul. 30, 2020

Related U.S. Application Data

(60) Continuation of application No. 15/962,643, filed on Apr. 25, 2018, now Pat. No. 11,109,711, which is a
(Continued)

(51) Int. Cl.
*A47L 17/06* (2006.01)
*A47L 13/022* (2006.01)
(Continued)

(52) U.S. Cl.
CPC ........... *A47L 17/06* (2013.01); *A47J 37/0786* (2013.01); *A47L 13/022* (2013.01); *A47J 43/288* (2013.01)

(58) Field of Classification Search
CPC ........ A47L 13/02; A47L 13/022; A47L 17/06; A47J 37/0786; A47J 43/288
See application file for complete search history.

(56) References Cited

U.S. PATENT DOCUMENTS 6,061,862 A * 5/2000 Whitaker ................ A21B 3/16
15/111
6,485,074 B1 * 11/2002 Floyd .................. A47J 37/0786
15/236.01
(Continued)

FOREIGN PATENT DOCUMENTS

| CA | 2386483 A1 * | 11/2003 | ............... B08B 1/00 |
| CA | 3012375 A1 * | 1/2020 | ............. A47L 17/06 |
| GB | 202236 A * | 8/1923 | ............. A47L 17/06 |

OTHER PUBLICATIONS

"DK Science: Chemical Reactions", 2007, Dorling Kindersley. (Year: 2007).*

*Primary Examiner* — Laura C Guidotti
(74) *Attorney, Agent, or Firm* — Merchant & Gould, P.C.

(57) ABSTRACT

A barbeque grill scraper and related methods of use that utilize a scraping end formed of a heat-responsive material to remove char and other debris from the grilling surface. The grill scraper includes a conformable scraping edge formed of the heat-responsive material. As the conformable scraping edge is drawn back and forth along the heated grilling surface, a combination of pressure applied by a user as well as the heat of the grill surface results in the formation of individual grooves along the conformable scraping edge, wherein each groove is formed to match an upper profile of the grilling surface. Over time, the grooves fully conform to the upper profile of the grilling surface such that an entire cooking surface can be scraped clean of char and debris.

20 Claims, 10 Drawing Sheets

Related U.S. Application Data continuation of application No. 15/819,859, filed on Nov. 21, 2017, now abandoned, which is a continuation of application No. 14/286,097, filed on May 23, 2014, now Pat. No. 9,820,612, which is a division of application No. 13/092,545, filed on Apr. 22, 2011, now Pat. No. 8,741,068.

(60) Provisional application No. 61/327,772, filed on Apr. 26, 2010.

(51) Int. Cl.
*A47J 37/07* (2006.01)
*A47J 43/28* (2006.01)

(56) References Cited

U.S. PATENT DOCUMENTS

| | | | |
|---|---|---|---|
| 9,820,612 B2 * | 11/2017 | Thompson | A47J 37/0786 |
| 11,109,711 B2 * | 9/2021 | Thompson | A47L 13/08 |
| 2005/0011029 A1 * | 1/2005 | Yu | A47L 13/12 |
| | | | 15/111 |

* cited by examiner

BBQ GRILL SCRAPER

RELATED APPLICATIONS

This application is a continuation of application Ser. No. 15/962,643 filed Apr. 25, 2018, a continuation of application Ser. No. 15/819,859 filed Nov. 21, 2017, which is a continuation of application Ser. No. 14/286,097 filed May 23, 2014, which in turn is a division of application Ser. No. 13/092,545 filed Apr. 22, 2011, which claims the benefit of U.S. Provisional Application No. 61/327,772 filed Apr. 26, 2010, each of which is hereby fully incorporated herein by reference.

FIELD OF THE INVENTION

The present application is related to tools for maintaining a barbeque grill. More specifically, the present application is directed to a cleaning tool for cleaning and removing debris from a cooking grate in a barbeque grill wherein during use, the cleaning tool conforms to the physical layout of the cooking grate.

BACKGROUND OF THE INVENTION

One of the most common forms of entertainment and socializing during periods of warm weather is to cook outdoors on a barbeque (BBQ) grill. These grills can take a variety of forms including those fueled by charcoal, propane or natural gas. Many individuals have their own personal grills located on backyard decks or patios while many public parks will have permanent grills available to be used by park visitors.

Regardless of grill design or location, one common result is the formation of charred debris on a grate surface of the grill. This charred debris is formed from the foods being cooked on the grate surface including meat, fish, vegetables and the like. The presence of this charred debris on the grate surface can create an unsatisfactory eating experience by having a detrimental impact on the taste and appearance of food being cooked. Generally, users are encouraged to remove the charred debris and a variety of cleaning tools are commercially available including a wide variety of brush and scraper tools.

Unfortunately, commercially-available cleaning tools suffer from a number of issues. Brushes often become clogged with debris such that a user is cleaning a dirty grilling grate with a dirty brush. Scrapers generally have a hard scraping surface that can clean an upper surface of the grill grate but do not conform well with rounded surfaces that are frequently present on grill grates such that the charred debris often remains present on the sides and bottoms of the grill grate. As there are a variety of issues with commercially available grill cleaning tools, it would be advantageous to have a new grill cleaning tool that is well equipped to deal with charred debris of the type found on almost every barbeque grill grate.

SUMMARY OF THE INVENTION

The present invention is directed to a barbeque grill scraper that includes a scraping end formed of a heat-responsive material. Generally, the scraping end defines a conformable scraping edge that is drawn back and forth across a hot grilling surface to remove char and other debris from the grilling surface. As the conformable scraping edge slides back and forth along the heated grilling surface, a combination of pressure applied by a user as well as the heat of the grill surface results in the formation of individual grooves along the conformable scraping edge, wherein each groove is formed to match an upper profile of the grilling surface. Over time, the grooves fully conform to the upper profile of the grilling surface such that an entire cooking surface can be scraped clean of char and debris.

In one aspect, the present invention is directed to a barbeque grill scraper that includes a scraping end formed of a heat-responsive material. The heat-responsive material is generally selected due to its non-toxic qualities and in some preferred embodiments, comprises a suitable wood species. The wood species can be selected based upon expected grilling temperatures or alternative, based upon a "seasoning" to be applied to a grilling surface. The grill scraper includes a grasping end and can optionally include additional gripping features on a body surface, such as, for example, a gripping aperture or reduced body profile so as to allow a user to easily grasp and manipulate the grill scraper. Generally, the scraping end defines a conformable scraping edge that is drawn back and forth across a hot grilling surface to remove char and other debris from the grilling surface. As the conformable scraping edge slides back and forth along the heated grilling surface, a combination of pressure applied by a user as well as the heat of the grill surface results in the formation of individual grooves in the heat-responsive material along the conformable scraping edge, wherein each groove is formed to match an upper profile of the grilling surface. Over time, the grooves fully conform to the upper profile of the grilling surface such that an entire cooking surface can be scraped clean of char and debris. In some embodiments, the scraping end can be replaceably attached to a scraper body such that the scraping end can be disposed of and replaced at the end of its useful life or to allow a user to mix and match scraping ends based upon grilling temperatures or desired seasoning to be applied to the grilling surface.

In another aspect, the present invention is directed to scraping a barbeque grill with a grill scraper that includes a scraping end formed of a heat-responsive material. Generally, a grill scraper is provided that includes a conformable scraping edge made of the heat-responsive material. Next, a user grasps the grill scraper and slides it back and forth across a hot grilling surface with the conformable scraping edge in direct contact with the hot grilling surface. The method further includes forming individual grooves in the conformable scraping edge that match an upper profile or cooking surface of the grilling surface. Finally, the method comprises fully conforming the grooves to the upper profile of the grilling surface such that the entire cooking surface can be scraped clean of char and debris. In some embodiments, the method can further comprise removing the scraping end from a manipulation end and replacing the scraping end with a second scraping end based upon the original scraping end reaching the end of its useful life or based on cooking conditions such as, for example, temperature or the desire to season the cooking surface.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The present invention is more completely understood in consideration of the following detailed description of various embodiments in connection with the accompanying drawings, in which.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION OF THE DRAWINGS

Figure 1:
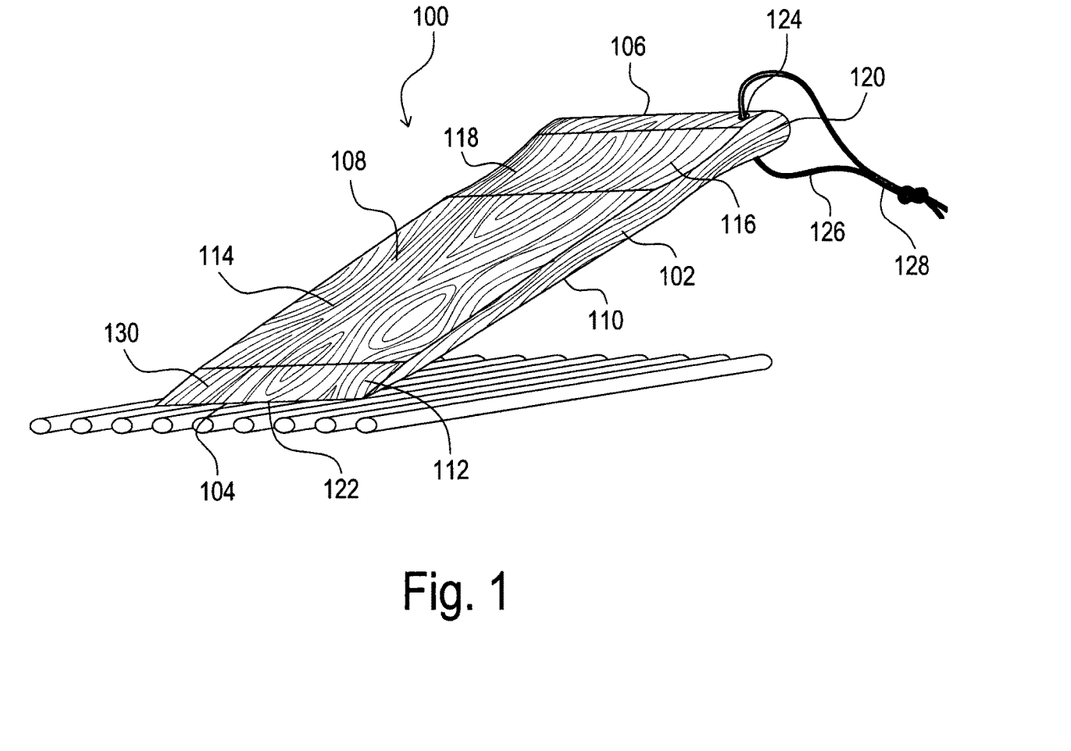
FIG. 1 is a front, perspective view of a grill scraper positioned for scraping a grilling surface according to a representative embodiment of the present invention.
Figure 2:
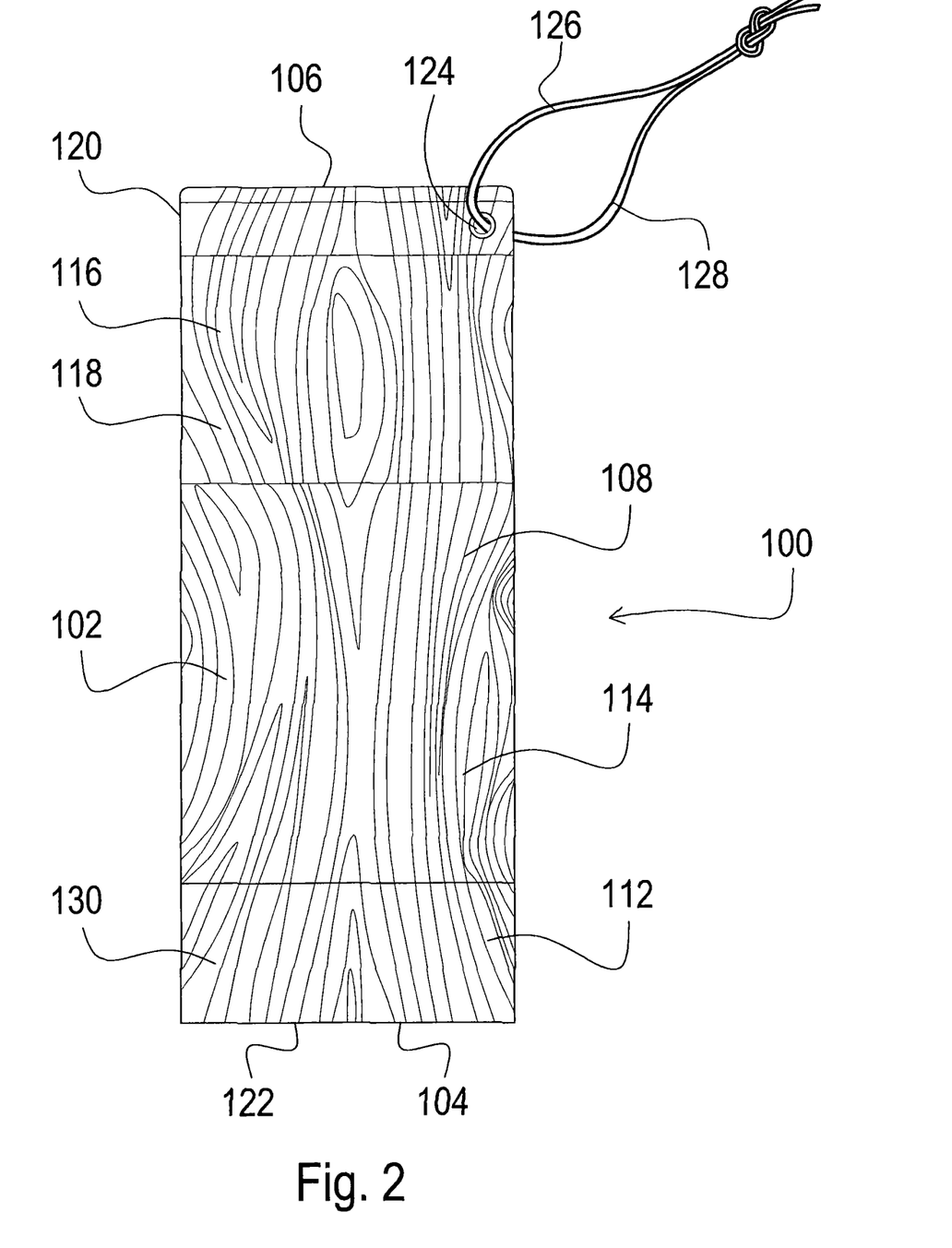
FIG. 2 is a top view of the grill scraper of FIG. 1.
Figure 3:
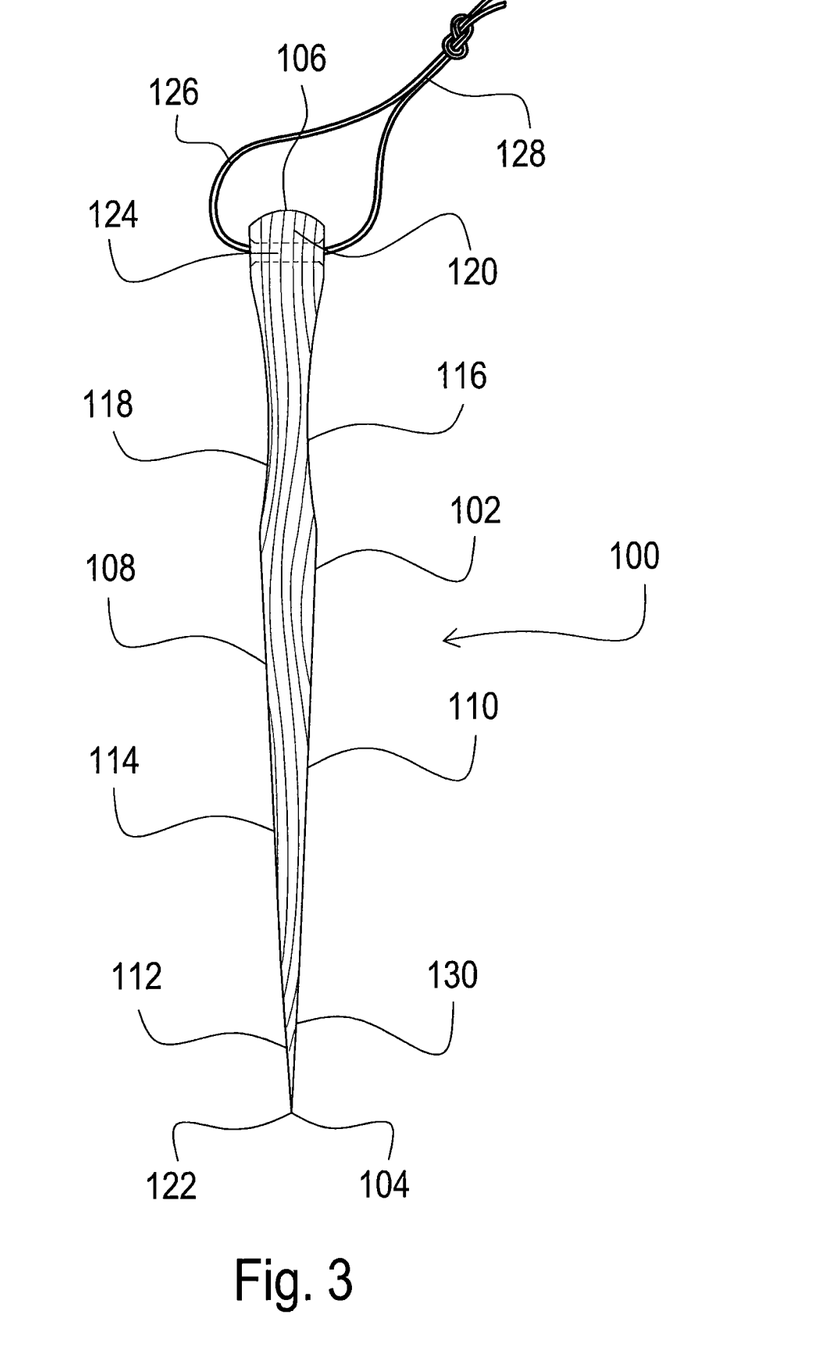
FIG. 3 is a side view of the grill scraper of FIG. 1.

Referring now to FIGS. 1, 2 and 3, a representative embodiment of a grill scraper 100 can comprise a scraper body 102 having a scraping end 104 and a manipulation end 106. Scraper body 102 includes an upper surface 108 and a lower surface 110. In some embodiments, upper surface 108 and lower surface 110 can be identical in appearance while in yet other embodiments, upper surface 108 and lower surface 110 can include differing performance features. As illustrated in FIG. 2, upper surface 108 and lower surface 110 can each include a beveled scraping surface 112, a main body surface 114 and a grip region 116. Grip region 116 can include a variety of features promoting holding and application of scraping force at the manipulation end 106 such as, for example, an indented surface 118 and a rounded grip end 120. Beveled scraping surface 112 terminates in a conformable scraping edge 122 at scraping end 104. A retention aperture 124 can extend between the upper surface 108 and lower surface 100 proximate the manipulation end 106. Retention aperture 122 can accommodate a storage accessory 126 such as a hook or a lanyard 128 as seen in FIG. 1 such that grill scraper 100 can be hung on or in proximity to a barbeque grill.

Grill scraper 100 is generally formed of a heat-responsive material 130 that allows for conformable scraping edge 122 to continually adapt to a grill surface being scraped in response to the heat of the grill surface. Generally, heat-responsive material 130 can comprise suitable non-toxic materials that are conformable in response to heat but that do not deposit or leave debris or ash on a grill surface being cleaned. In a preferred embodiment, heat-responsive material 130 comprises a suitable wood species variety such as, for example, oak, hickory, cedar, alder and the like. Depending upon the type of food being prepared, certain advantages may exist for using a specific variety of wood species as the heat-responsive material 130. For example, hardwoods may be preferred when preparing foods at high heat while softwood varieties may be better suited for use with foods prepared with low heat. In addition, the variety of wood species utilized as heat-responsive material 130 may be selected due to a "seasoning" flavor applied to the grill surface by the chosen wood species as grill scraper 100 is utilized to scrape the grill surface.

Figure 4:
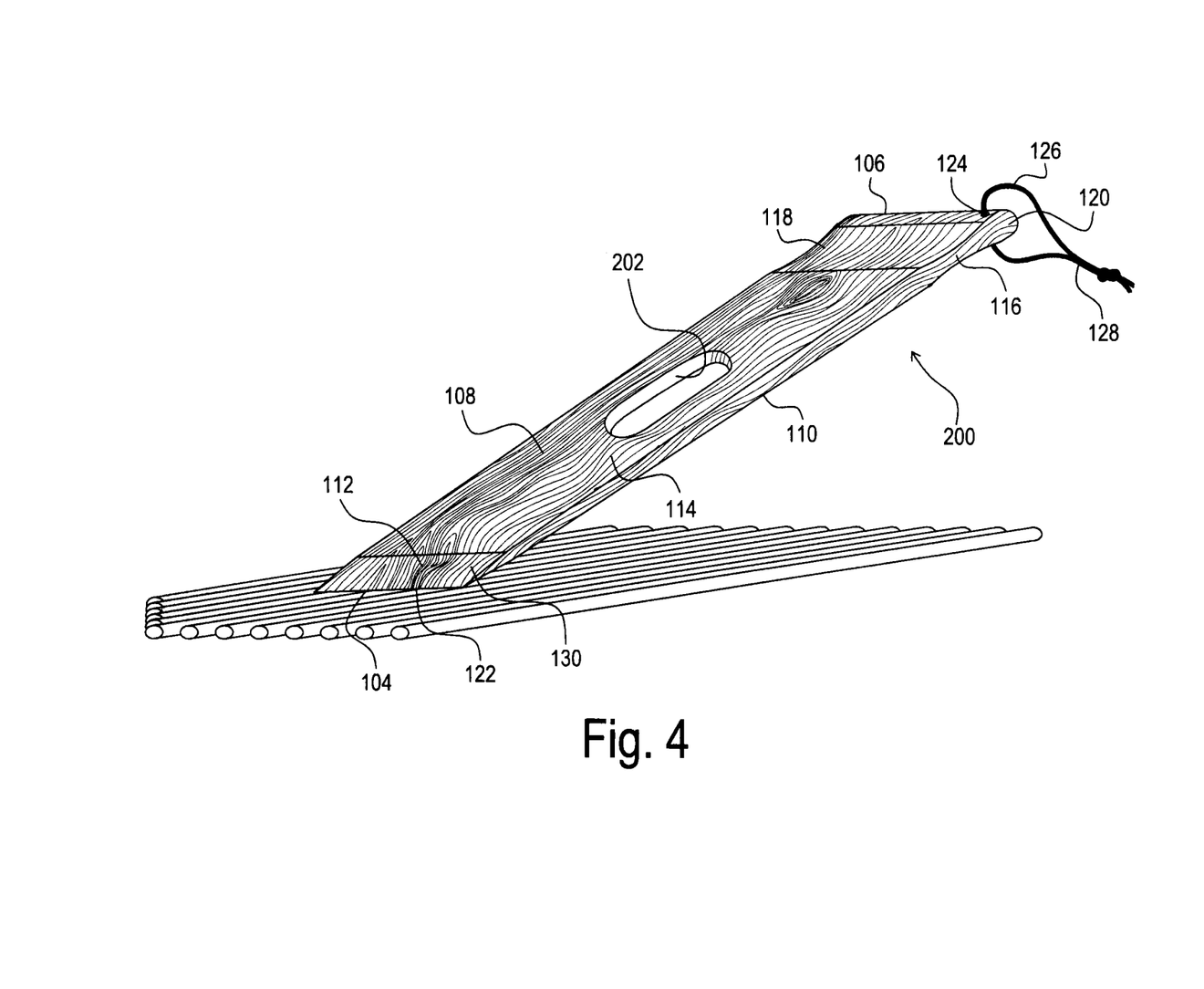
FIG. 4 is a front, perspective view of a grill scraper positioned for scraping a grilling surface according to a representative embodiment of the present invention.
Figure 5:
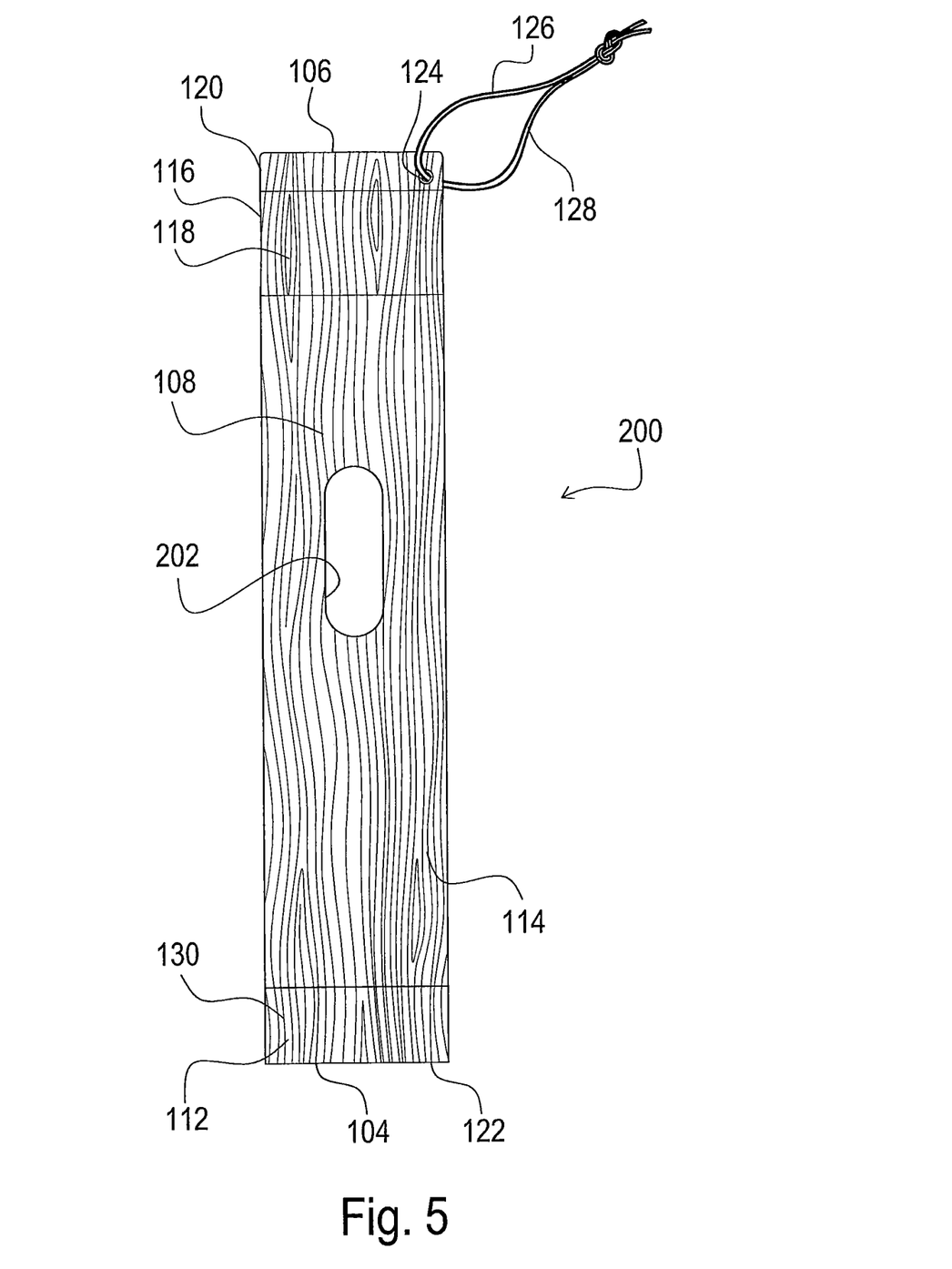
FIG. 5 is a top view of the grill scraper of FIG. 4.
Figure 6:
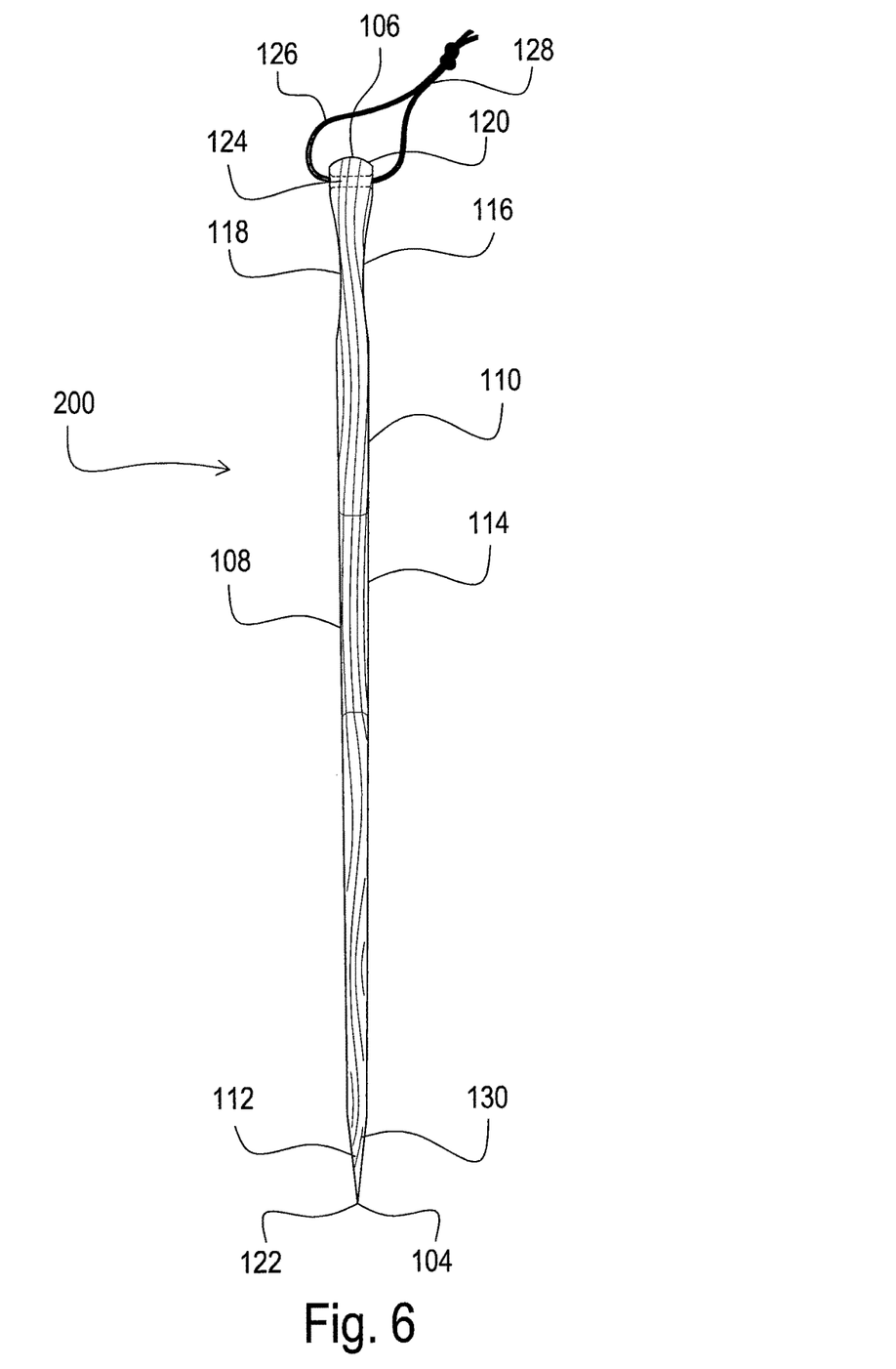
FIG. 6 is a side view of the grill scraper of FIG. 4.

As illustrated in FIGS. 4, 5 and 6, an alternative embodiment of a grill scraper 200 can substantially resemble grill scraper 100 with the further inclusion of a grip aperture 202 extending between the upper surface 108 and the lower surface 110. Grip aperture 202 can be located at a suitable position on main body surface 114. Grip aperture 202 provides a user with an additional grip point whereby additional force can be applied during the scraping process. In some embodiments, the presence of grip aperture 202 can allow grill scraper 200 to stored by hanging the grill scraper 200 by the grip aperture 200, thereby allowing for the removal of retention aperture 122 and storage accessory 126.

Figure 7:
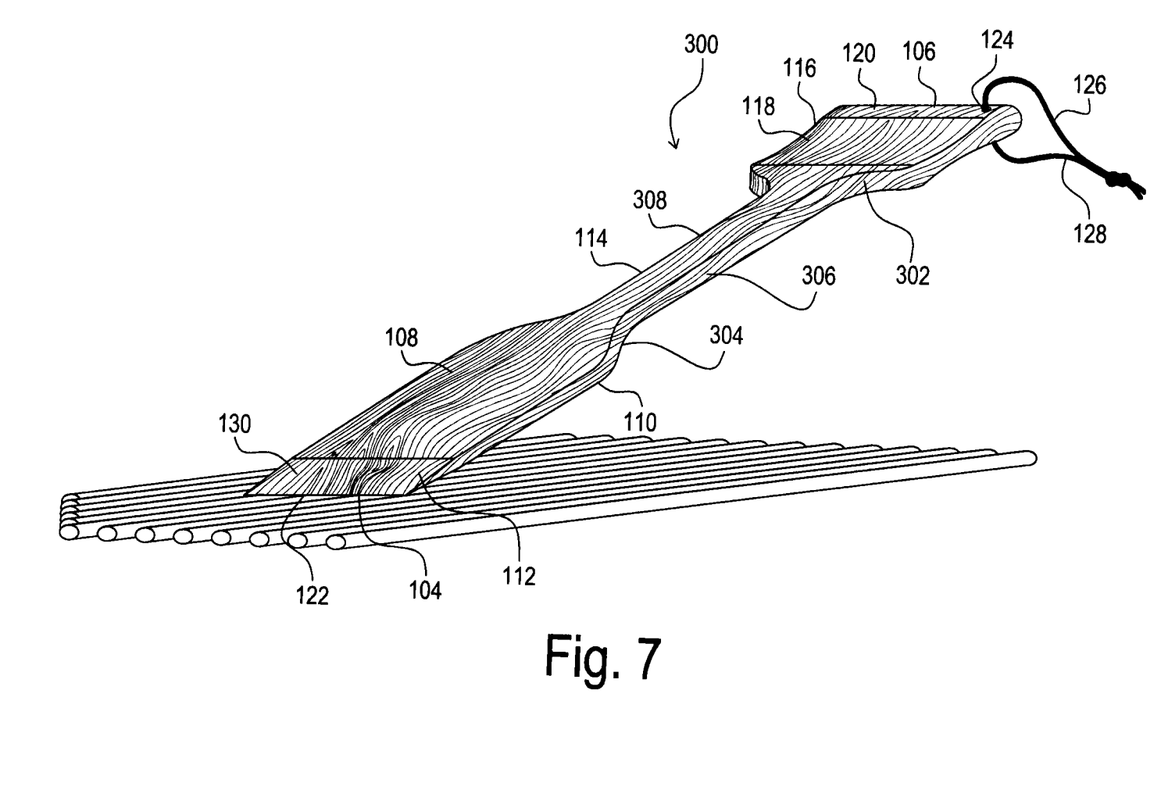
FIG. 7 is a front, perspective view of a grill scraper positioned for scraping a grilling surface according to a representative embodiment of the present invention.

Referring now to FIG. 7, an alternative embodiment of a grill scraper 300 can substantially resemble grill scraper 100 with the addition of modifications to the main body surface 114. Grill scraper 300 can comprise a rear tapered surface 302, a forward tapered surface 304 and a central grasping surface 306. Central grasping surface 306 has a reduced exterior perimeter 308 so as to make it easier for a user to wrap their hand about and grasp the grill scraper 300. In this way, a user is provided with an additional grip point whereby additional force can be applied during the scraping process.

Figure 8:
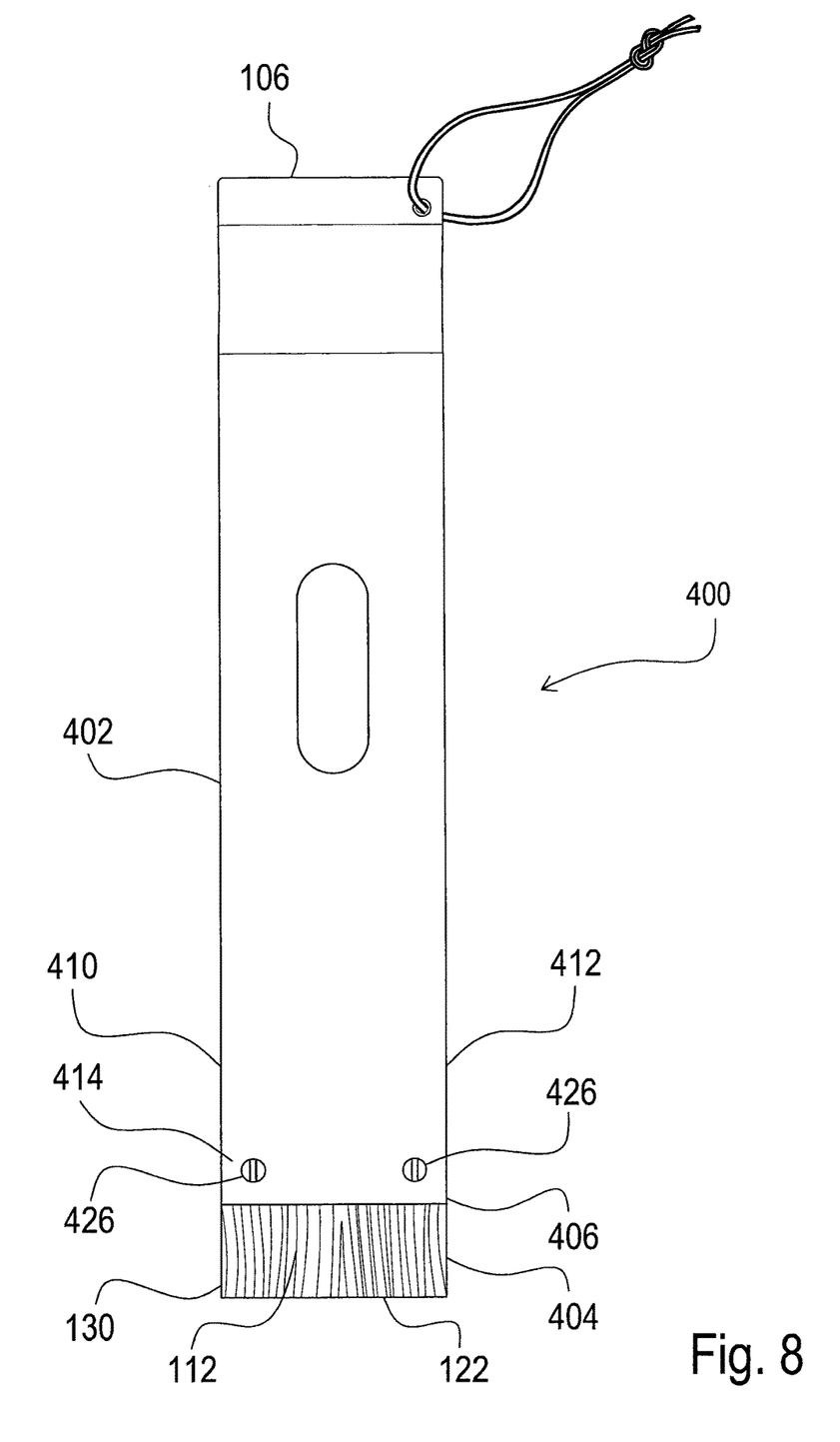
FIG. 8 is a top view of a grill scraper including a replaceable scraping end according to a representative embodiment of the present invention.
Figure 9:
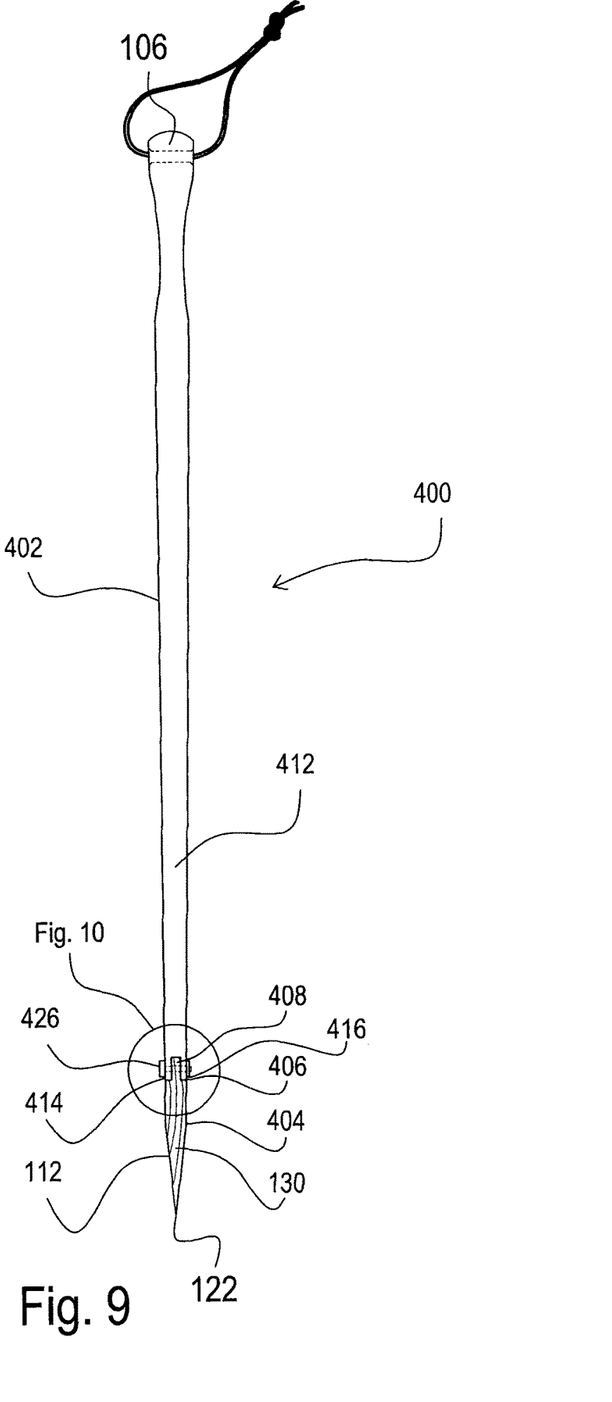
FIG. 9 is a side view of the grill scraper of FIG. 8.
Figure 10:
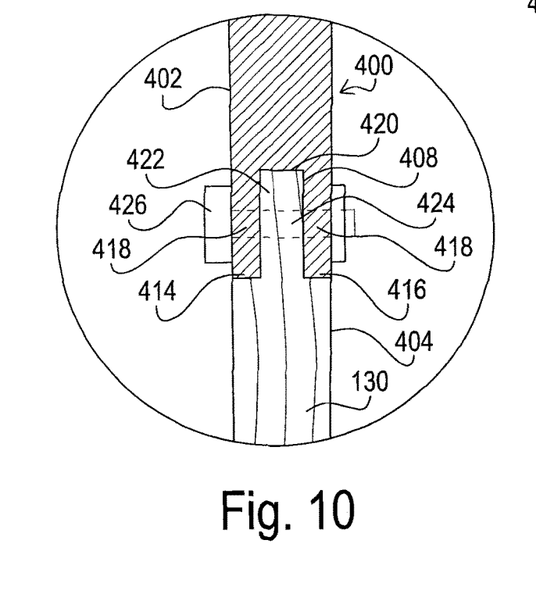
FIG. 10 is a detailed view of the grill scraper of FIG. 8 taken at Detail 10 of FIG. 9.

As illustrated in FIGS. 8, 9 and 10, another alternative embodiment of a grill scraper 400 can substantially resemble grill scraper 200 with the inclusion of a permanent body portion 402 and a replaceable scraper portion 404. Permanent body portion 402 generally comprises manipulation end 106 and a receiving end 406. Receiving end 406 generally comprises a longitudinal slot 408 extending between a first side 410 and a second side 412. Receiving end 406 can further comprise an upper slot surface 414 and a lower slot surface 416 wherein a pair of fastener apertures 418 are aligned so as to be continuous between the upper surface 108 and lower surface 110. Replaceable scraper portion 404 includes an insertion end 420 and scraping surface 112. Insertion end 420 includes a projecting surface 422 configured so as to insert snugly into the longitudinal slot 406. Projecting surface 422 can include a pair of projection apertures 424 that are sized and aligned so as to correspond with fastener apertures 418. With the projecting surface 422 fully inserted into longitudinal slot 406 such that corresponding fastener apertures 418 are aligned with corresponding projection apertures 424, a pair of fasteners 426 such as, for example, nuts and screws can be utilized to retainably couple the permanent body portion 402 with the replaceable scraper portion 404.

Grill scraper 400 can provide a number of benefits including those related to material selection. For instance, permanent body portion 402 can be constructed of easily cleaned or dishwasher safe materials such as stainless steel or plastic. In addition, additional materials can be utilized such as, for example, rubberized sections on permanent body portion 402 to enhance a users overall grip of the grill scraper 400. In addition, replaceable scraper portion 404 can be replaced as the scraping surface 112 deteriorates or can be swapped out for a second replaceable scraper portion 404 better suited for the food being cooked based upon cooking temperatures or seasoning desired.

Operation and use of grill scrapers of the present invention are illustrated in FIGS. 1, 4, 7 and 11-14. While operation is generally described with respect to grill scraper 100, it is to be understood that the method would apply to each of the previously described embodiments. Generally, grill scraper 100 is intended for use with a heated barbeque grill, either prior to cooking or following cooking. A user grasps grill scraper 100 at the manipulation end 106 and positions the scraping end 104 against a grilling surface 500, typically a wire grate 502. The user can apply additional pressure to the scraping end by pressing down with their second hand on the main body surface 114 or alternatively grasping the grip aperture 202 or the central grasping surface 306. While maintaining pressure on the scraper body 102, the user slides the grill scraper 100 forward and back along the grilling surface 500 such that conformable scraping edge 122 remains in continuous contact with the grilling surface 500.

Figure 11:
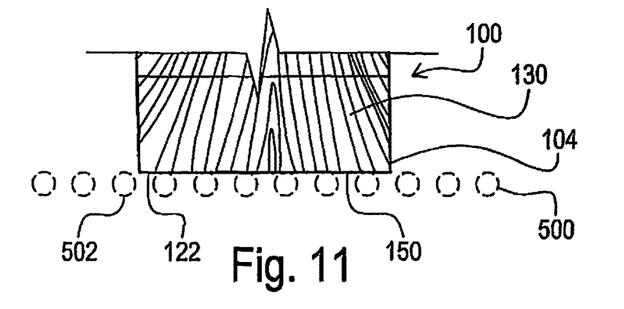
FIG. 11 is a front view of a scraping end and a heated grilling surface illustrating an initial use of a grill scraper according to a representative embodiment of the present invention.
Figure 12:
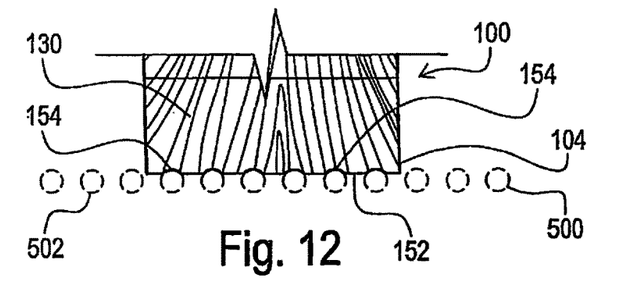
FIG. 12 is a front view of a scraping end positioned against a heated grilling surface illustrating an onset of customization to a conformable scraping edge during use of a grill scraper according to a representative embodiment of the present invention.
Figure 13:
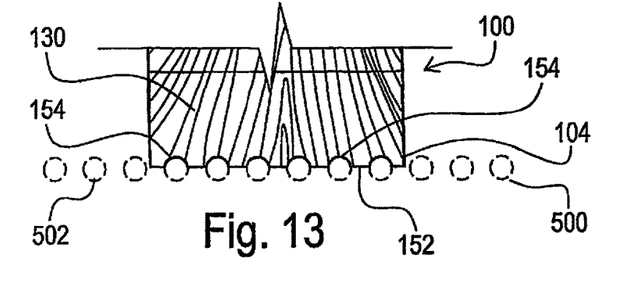
FIG. 13 is a front view of a scraping end positioned against a heated grilling surface illustrating the progression of a conformable scraping edge during subsequent use of the grill scraper according to a representative embodiment of the present invention.
Figure 14:
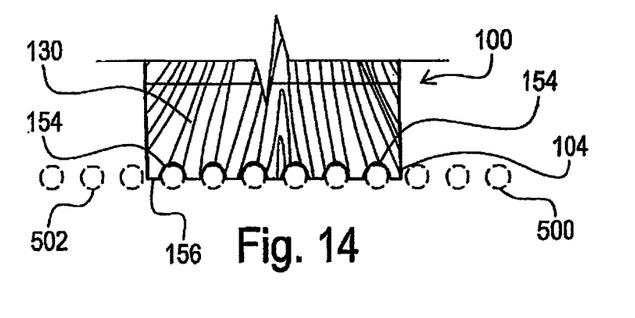
FIG. 14 is a front view of a scraping end positioned against a heated grilling surface illustrating the full transition of a conformable scraping edge to match an upper profile of the heated grilling surface according to a representative embodiment of the present invention.

Grilling surface 500 is generally constructed of metallic or ceramic materials and during cooking, can be heated to temperatures of more than 500° F. As illustrated in FIG. 11, conformable scraping edge 122 is initially provided with a straight scraping edge 150. As the conformable scraping edge 122 is slid along the heated grilling surface 500, the straight scraping edge 150 begins to change in response to the effects of the heated grilling surface 500 on the heat-responsive material 130 as shown in FIGS. 12 and 13. In the case of heat-responsive material 130 comprising a suitable wood species, the heat-responsive material 130 essentially begins to combust such that the straight scraping edge 150 assumes a transitional scraping edge 152 in which grooves 154 begin to become burned into the conformable scraping edge 122 based upon the profile and spacing of the grilling surface 500. After one or more uses, grooves 154 are fully burned into the conformable scraping edge 122 such that a fully conformed scraping edge 156 includes a plurality of grooves 154 that substantially resemble the top profile of the grilling surface 500 as shown in FIG. 14. In the case of grilling surface 500 comprising a wire grate, the fully conformed scraping edge 156 includes grooves 154 such that the fully conformed scraping edge 156 is in direct contact with an upper 180° of each wire which is essentially the cooking surface upon which food comes into contact. Once fully conformed scraping edge 156 has been formed, sliding the grill scraper 100 forward and back along the grilling surface 500 allows for scraping along the entire cooking surface to remove char and other debris. Furthermore, the sensitivity of the heat-responsive material 130 to the heated grill surface 500 ensures that any surface coatings on the grilling surface are not scraped off or otherwise damaged when using the grill scraper 100.

The foregoing descriptions present numerous specific details that provide a thorough understanding of various embodiments of the invention. It will be apparent to one skilled in the art that various embodiments, having been disclosed herein, may be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments can be constructed that nevertheless employ the principles and spirit of the present invention. Accordingly, this application is intended to cover any adaptations or variations of the invention. It is manifestly intended that this invention be limited only by the following claims and equivalents thereof.

The invention claimed is:

1. A grill scraper, comprising:
a scraper body made of a wood, the scraper body having a manipulation end, a scraping end, an upper surface and a lower surface, wherein the lower surface includes a tapered scraping surface that terminates at the scraping end to define a conformable scraping edge defining a grooved portion,
wherein the scraper body defines a central grasping surface arranged between the manipulation end and the scraping end, the central grasping surface having a reduced width as compared to the scraping end,
wherein the conformable scraping edge is formed through an application of pressure against one or more heated gratings of a grilling surface, wherein the application of pressure against the one or more heated gratings of the grilling surface causes a portion of the scraper body to combust, resulting in the grooved portion being burned in the conformable scraping edge, wherein the grooved portion includes interposed burned and unburned portions corresponding to an upper profile of the heated gratings of the grilling surface.

2. The grill scraper of claim 1, wherein the manipulation end further includes an aperture.

3. The grill scraper of claim 2, wherein manipulation end includes a hook, the hook configured to couple to the aperture.

4. The grill scraper of claim 2, wherein manipulation end includes a lanyard, the lanyard configured to couple to the aperture.

5. A grill scraper, comprising:
a scraper body made of a wood, the scraper body having a manipulation end, a scraping end, an upper surface and a lower surface, wherein the lower surface includes a beveled scraping surface that terminates at the scraping end to define a conformable scraping edge,
the scraper body defining a grip aperture extending between the upper surface and the lower surface,
wherein the conformable scraping edge defines a grooved scraping edge, the grooved scraping edge having one or more grooves, wherein the grooved scraping edge is formed through an application of pressure against one or more heated gratings of a grilling surface, wherein the application of pressure against the one or more heated gratings of the grilling surface causes a portion of the scraper body to combust, resulting in the one or more grooves being burned in the conformable scraping edge, wherein the grooved scraping edge includes interposed burned and unburned portions matching an upper profile of the heated gratings of the grilling surface.

6. The grill scraper of claim 5, wherein the manipulation end further includes an aperture.

7. The grill scraper of claim 6, wherein the manipulation end includes a hook, the hook configured to couple to the aperture.

8. The grill scraper of claim 6, wherein the manipulation end includes a lanyard, the lanyard configured to couple to the aperture.

9. A grill scraper, comprising:
a scraper body made of a wood, the scraper body having a manipulation end, a scraping end, an upper surface and a lower surface, wherein the lower surface includes a tapered scraping surface that terminates at the scraping end to define a conformable scraping edge, the manipulation end further including an aperture;
wherein the scraper body defines a central grasping surface arranged between the manipulation end and the scraping end, the central grasping surface having a reduced width as compared to the scraping end;
wherein the conformable scraping edge defines an initial substantially straight scraping edge, and wherein a grooved portion is formed in the conformable scraping edge through an application of pressure against one or more heated gratings of a grilling surface, wherein the application of pressure against the one or more heated gratings of the grilling surface causes a portion of the scraper body to combust, resulting in the grooved portion being burned in the conformable scraping edge, wherein the grooved portion includes interposed burned and unburned portions matching an upper profile of the heated gratings of the grilling surface.

10. The grill scraper of claim 9, wherein manipulation end includes a hook, the hook configured to couple to the aperture.

11. The grill scraper of claim 9, wherein manipulation end includes a lanyard, the lanyard configured to couple to the aperture.

12. A grill scraper, comprising:
a scraper body made of a wood, the scraper body having a manipulation end, a scraping end, an upper surface and a lower surface, wherein both the upper surface and the lower surface include a beveled scraping surface that terminates at the scraping end to define a conformable scraping edge,
wherein the scraper body defines a central grasping surface arranged between the manipulation end and the scraping end, the central grasping surface having a reduced thickness as compared to the manipulating end;
wherein the conformable scraping edge is modified to define a grooved scraping edge through an application of pressure against one or more heated gratings of a grilling surface, wherein the application of pressure against the one or more heated gratings of the grilling surface causes a portion of the scraper body to combust, resulting in the grooved scraping edge being burned in the conformable scraping edge, wherein the grooved scraping edge includes interposed burned and unburned portions conforming to an upper profile of the heated gratings of the grilling surface.

13. The grill scraper of claim 12, wherein the manipulation end further includes one or more apertures.

14. The grill scraper of claim 13, wherein manipulation end includes a hook, the hook configured to couple to the one or more apertures.

15. The grill scraper of claim 13, wherein manipulation end includes a lanyard, the lanyard configured to couple to the one or more apertures.

16. A grill scraper, comprising:
a scraper body made of a wood, the scraper body having a manipulation end, a scraping end, an upper surface and a lower surface, the scraper body defining a beveled scraping surface that terminates at the scraping end to define a conformable scraping edge,
wherein the scraper body defines a rear tapered surface arranged between the manipulation end and a grasping surface, and the scraper body further defines a forward tapered surface arranged between the grasping surface and the scraping end, the grasping surface defining a reduced exterior perimeter arranged between the rear tapered surface and the forward tapered surface, the grasping surface having a reduced width as compared to the scraping end;
wherein the conformable scraping edge extends along the entire beveled scraping surface to the scraping end and defines a plurality of grooves having a profile and a spacing arranged only on the conformable scraping edge,
wherein the plurality of grooves are entirely formed through an application of pressure against one or more heated gratings of a grilling surface, wherein the application of pressure against the one or more heated gratings of the grilling surface causes a portion of the scraper body to combust, resulting in the plurality of grooves being burned in the conformable scraping edge, wherein the plurality of grooves includes interposed burned and unburned portions matching an upper profile of the heated gratings of the grilling surface.

17. The grill scraper of claim 16, wherein the beveled scraping surface is defined only in the lower surface of the scraper body.

18. The grill scraper of claim 16, wherein the beveled scraping surface is defined only in the upper surface of the scraper body.

19. The grill scraper of claim 16, wherein the reduced exterior perimeter is sized and configured to conform with a hand of a user to facilitate grasping the grill scraper.

20. The grill scraper of claim 16, wherein the conformable scraping edge is configured to form the plurality of grooves contoured to the top profile of a grilling surface after one or more uses.

* * * * *